United States Patent
Coronado et al.

(10) Patent No.: US 10,902,120 B2
(45) Date of Patent: *Jan. 26, 2021

(54) FILE INTEGRITY PRESERVATION

(71) Applicant: INTERNATIONAL BUSINESS MACHINES CORPORATION, Armonk, NY (US)

(72) Inventors: Juan A. Coronado, Tucson, AZ (US); Sara M. Coronado, Tucson, AZ (US); Christina A. Lara, Tucson, AZ (US); Lisa R. Martinez, Escondido, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/653,454

(22) Filed: Jul. 18, 2017

(65) Prior Publication Data

US 2017/0316208 A1 Nov. 2, 2017

Related U.S. Application Data

(63) Continuation of application No. 14/610,922, filed on Jan. 30, 2015, now Pat. No. 9,836,604.

(51) Int. Cl.
  *G06F 21/56* (2013.01)
  *G06F 16/17* (2019.01)
  *G06F 21/57* (2013.01)

(52) U.S. Cl.
  CPC ........... *G06F 21/566* (2013.01); *G06F 16/17* (2019.01); *G06F 21/565* (2013.01); *G06F 21/57* (2013.01)

(58) Field of Classification Search
  CPC . G06F 21/566; G06F 17/30129; G06F 21/565

(Continued)

(56) References Cited

U.S. PATENT DOCUMENTS 5,155,845 A    10/1992   Beal et al.
6,088,803 A *   7/2000   Tso .................. H04L 63/145
                                                           709/203

(Continued)

FOREIGN PATENT DOCUMENTS

CN    101799742 A    8/2010
CN    102905269 A    1/2013

(Continued)

OTHER PUBLICATIONS

"Towards Disk-Level Malware Detection"—Paul et al, University of Virginia, Dept. of Computer Science, Jan. 2005 https://www.researchgate.net/publication/250728027_Towards_Disk-Level_Malware_Detection (Year: 2005).*

(Continued)

*Primary Examiner* — Randy A Scott

(74) *Attorney, Agent, or Firm* — Wiliam K. Konrad; Konrad Raynes Davda & Victor LLP

(57) ABSTRACT

In one embodiment of file integrity preservation in accordance with the present description, a file is subdivided into a plurality of subfiles, and a write update originally targeted for a portion of that file contained within one of the subfiles, is instead directed to a temporary copy subfile. As a consequence, the temporary copy subfile which is updated with the write data, may be scanned for viruses or other malware separately from the original file and its corresponding original subfile. If the temporary copy subfile passes the scanning test, the originally targeted file may be updated with the updated contents of the clean temporary copy subfile. Conversely, in the event that the write update introduced malicious software to the temporary copy subfile, the original file and its corresponding original subfile remain uncontaminated by the write update. Other aspects are also described.

21 Claims, 13 Drawing Sheets

(58) Field of Classification Search
USPC .......... 726/1, 22, 23, 24; 713/150, 153, 155, 713/176; 707/657, 803, 822
See application file for complete search history.

(56) References Cited

U.S. PATENT DOCUMENTS

| | | | |
|---|---|---|---|
| 6,088,806 | A | 7/2000 | Chee |
| 6,453,392 | B1 | 9/2002 | Flynn, Jr. |
| 7,467,198 | B2 | 12/2008 | Goodman et al. |
| 7,698,732 | B2* | 4/2010 | Naglieri .............. H04L 63/08 726/2 |
| 7,975,303 | B1 | 7/2011 | Millard |
| 8,220,053 | B1* | 7/2012 | Sun .................. G06F 21/562 726/24 |
| 8,839,431 | B2* | 9/2014 | Bennett .............. G06F 21/51 726/22 |
| 8,856,927 | B1 | 10/2014 | Beloussov et al. |
| 8,856,972 | B2* | 10/2014 | Kirshon ............. A42B 3/121 2/413 |
| 9,043,914 | B2 | 5/2015 | Coronado et al. |
| 2002/0174137 | A1* | 11/2002 | Wolff ................ G06F 21/568 |
| 2003/0126449 | A1 | 7/2003 | Kelly et al. |
| 2005/0055559 | A1* | 3/2005 | Bucher ............. G06F 21/568 713/188 |
| 2005/0257205 | A1* | 11/2005 | Costea ................ G06F 8/65 717/168 |
| 2006/0174325 | A1 | 8/2006 | Naglieri |
| 2008/0222177 | A1 | 9/2008 | Ramer |
| 2008/0295177 | A1 | 11/2008 | Dellinger et al. |
| 2010/0115619 | A1 | 5/2010 | Burtscher |
| 2010/0205390 | A1 | 8/2010 | Arakawa |
| 2011/0047618 | A1* | 2/2011 | Evans ................ G06F 21/566 726/23 |
| 2011/0231369 | A1* | 9/2011 | Kawamura ........ G06F 11/1666 707/659 |
| 2014/0025641 | A1 | 1/2014 | Kumarasamy et al. |
| 2014/0059687 | A1 | 2/2014 | Coronado et al. |
| 2015/0286530 | A1 | 10/2015 | Coronado et al. |
| 2016/0224788 | A1 | 8/2016 | Coronado et al. |

FOREIGN PATENT DOCUMENTS

| | | |
|---|---|---|
| CN | 103632092 A | 3/2014 |
| EP | 1 681 609 | 7/2006 |
| WO | WO2013014033 A1 | 1/2013 |

OTHER PUBLICATIONS

G. Kim, et al., "The Design and Implementation of Tripwire: A File System Integrity Checker", ACM, 1994, pp. 12.
M. Lovelace, et al., "IBM Scale Out Network Attached Storage: Architecture, Planning, and Implementation Basics", IBM Corporation, Dec. 2010, Document SG24-7875-00, pp. 562.
PCT Application No. EP2016/051704, filed Jan. 27, 2016.
International Search Report & Written Opinion dated Mar. 21, 2016, pp. 10, for Application No. EP2016/051704, filed Jan. 27, 2016.
U.S. Appl. No. 14/610,922, filed Jan. 30, 2015.
Office Action dated Mar. 15, 2016, pp. 12, for U.S. Appl. No. 14/610,922, filed Jan. 30, 2015.
Response dated Jun. 15, 2016, pp. 15, to Office Action dated Mar. 15, 2016, pp. 12, for U.S. Appl. No. 14/610,922, filed Jan. 30, 2015.
Office Action dated Jun. 24, 2016, pp. 10, for U.S. Appl. No. 14/610,922, filed Jan. 30, 2015.
Response dated Nov. 25, 2016, pp. 15, to Office Action dated Jun. 24, 2016, pp. 10, for U.S. Appl. No. 14/610,922, filed Jan. 30, 2015.
Office Action dated Dec. 30, 2016, pp. 12, for U.S. Appl. No. 14/610,922, filed Jan. 30, 2015.
Response dated Mar. 30, 2017, pp. 14, to Office Action dated Dec. 30, 2016, pp. 12, for U.S. Appl. No. 14/610,922, filed Jan. 30, 2015.
Final Office Action dated May 10, 2017, pp. 8, for U.S. Appl. No. 14/610,922, filed Jan. 30, 2015.
Response dated Jul. 10, 2017, pp. 12, to Final Office Action dated May 10, 2017, pp. 8, for U.S. Appl. No. 14/610,922, filed Jan. 30, 2015.
L. Liu et al., "Smart Scan: Efficient Crawl for Storage Management Metatdata Querying in Large File Systems", Carnegie Mellon University, [online] http://www.pdl.cmu.edu/PDL-FTP/Storage/CMU-PDL-10-112.pdf.
Notice of Allowance dated Aug. 2, 2017, pp. 9, for U.S. Appl. No. 14/610,922, filed Jan. 30, 2015.
List of IBM Patents or Patent Applications Treated as Related, dated Aug. 10, 2017, pp. 2.
U.S. Pat. No. 9,043,914 is the English counterpart of CN103632092.
US20100205390 is the English counterpart of CN101799742.
English translation of CN101799742, dated Aug. 11, 2010, pp. 24.
English translation of CN102905269, dated Jan. 30, 2013, pp. 14.
English translation of CN103632092, dated Mar. 12, 2014, pp. 12.
Office Action dated Oct. 9, 2019, pp. 10, for Serial No. CN201680007934.5.

* cited by examiner

| | Status 230a | Server Identifier 235a | Subfile Address 240a |
|---|---|---|---|
| 220a | | | |
| 220b | Status 230b | Server Identifier 235b | Subfile Address 240b |
| 220c | Status 230c | Server Identifier 235c | Subfile Address 240c |
| 220d | Status 230d | Server Identifier 235d | Subfile Address 240d |

FILE INTEGRITY PRESERVATION

BACKGROUND OF THE INVENTION

1. Field of the Invention

The subject matter disclosed herein relates to data updates to files and to anti-virus file scanning.

2. Description of the Related Art

Files are often scanned for computer viruses and other malicious software frequently referred to as "malware." Such malicious software includes a variety of forms of hostile or intrusive software. Examples of malicious software include computer viruses, worms, trojan horses, and ransomware. Still other examples include spyware, adware, scareware, and other malicious programs. Malicious software can take the form of executable program code, scripts, active content, and other software. Malicious software is often disguised as, or embedded in, non-malicious files to facilitate the spread and to increase the difficulty in detecting the malicious software.

In some systems, upon a write operation to update a file, the write data is committed to the file to update the file, and an anti-virus scan is initiated on the updated file. Also in some systems, in order to facilitate the scanning process, a file to be scanned is subdivided into subfiles which are scanned separately by one or more scan servers. If the last write command introduces malicious software, the anti-virus scan can frequently detect it, and an attempt may be made to repair the infected file. If the repair of the infected file fails, the entire file is typically quarantined to prevent subsequent read operations to the infected file which can spread the malicious software. Hence, users are typically denied access to a quarantined file. However, a read operation directed to an infected file which has not been quarantined, may permit spread of the malicious software.

SUMMARY

Provided is a method for preserving file integrity in connection with a write operation to update a file, in which a temporary copy subfile corresponding to the originally targeted portion of the file, is created. Instead of committing the write update data to the originally targeted portion of the file, the write data is directed instead to update the temporary copy subfile. The updated temporary copy subfile may be scanned for malicious software, and if the updated temporary copy subfile passes the scan, the originally targeted portion of the file may be updated with the scanned update data contained by the temporary copy subfile which was determined to be free of malicious software.

In one embodiment, as a consequence of updating the temporary copy subfile instead of the original file, the temporary copy subfile after it has been updated with the write data, may optionally be scanned for viruses or other malware separately from the original file or its original subfile. Accordingly, in one embodiment, read access to the original file including the corresponding original subfile, may optionally be permitted while the temporary copy subfile is updated and scanned.

Conversely, in the event that the write update introduced malicious software to the temporary copy subfile, the original file and its corresponding original subfile remain uncontaminated by the write update. Accordingly, in one embodiment, access to the original file and its corresponding original subfile may optionally continue since they remain uncontaminated and their integrity has been preserved.

Still further, should the contaminated temporary copy subfile be quarantined, the original file and its corresponding original subfile may optionally remain free of quarantine since their integrity has been preserved. Accordingly, access to the original file and its corresponding original subfile may optionally continue since they remain uncontaminated and unquarantined.

In one embodiment, a location for the temporary copy subfile may optionally be obtained from a pool of available temporary subfile locations. In another embodiment, one or more attempts may optionally be made to repair the temporary copy subfile to eliminate the malicious software before the temporary copy subfile is quarantined. In another embodiment, the update data may optionally be resent one or more times to update one or more additional temporary copy subfiles instead of the original file.

Other embodiments are directed to systems, apparatus and computer program products. Still other aspects are described.

BRIEF DESCRIPTION OF THE DRAWINGS

FIG. 9 is a schematic block diagram illustrating one embodiment of an antivirus control file which may be used in connection with file integrity preservation in accordance with the present description;

DETAILED DESCRIPTION

Figure 1:
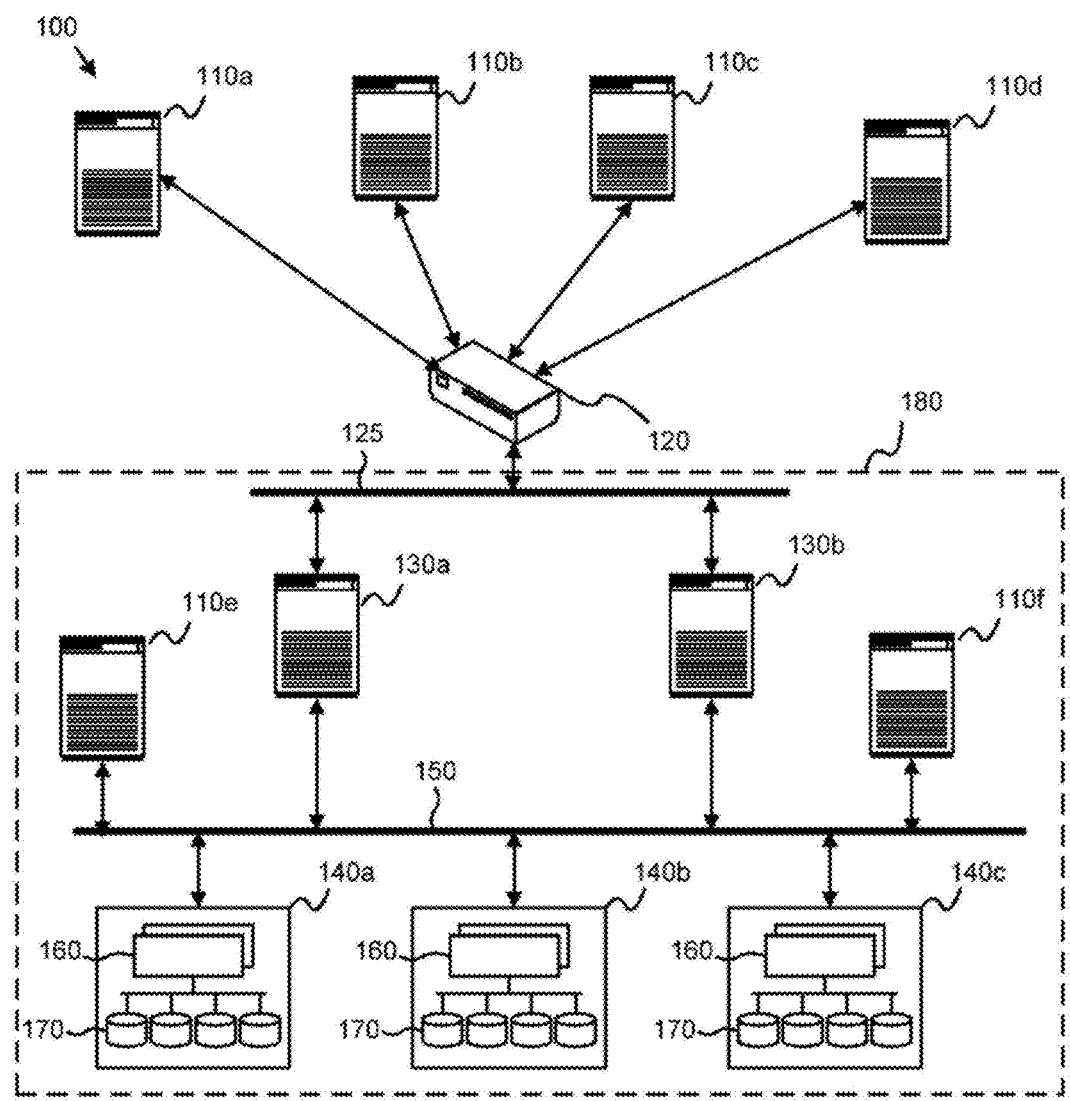
FIG. 1 is a schematic block diagram illustrating one embodiment of a data processing system employing file integrity preservation in accordance with the present description.

In one embodiment of file integrity preservation in accordance with the present description, a file is subdivided into a plurality of subfiles, and a write update originally targeted for a portion of that file contained within one of the subfiles, is instead directed to a temporary copy subfile. In this example, the temporary copy subfile contains a copy of the originally targeted subfile of the file and thus corresponds to the originally targeted subfile of the original file. As a consequence of updating the temporary copy subfile instead of the original file, the temporary copy subfile after it has been updated with the write data, may optionally be scanned for viruses or other malware separately from the original file or its original subfile. Accordingly, in one embodiment, read access to the original file including the corresponding original subfile, may optionally be permitted while the temporary copy subfile is updated and scanned.

In another aspect of the present description, if the temporary copy subfile passes the scanning test, the originally targeted file may be updated with the updated contents of the clean temporary copy subfile. Conversely, in the event that the write update introduced malicious software to the temporary copy subfile, the original file and its corresponding original subfile remain uncontaminated by the write update. Accordingly, access to the original file and its corresponding original subfile may optionally continue since they remain uncontaminated and their integrity has been preserved.

Thus, in those instances in which a read command is executed before a write update targeted for the same file has been completed and scanned for malicious software, spread of the malicious software may be avoided since the read operation may optionally be directed to the original file or subfile while the write update which may be carrying malicious software is directed to the temporary copy subfile. Accordingly, should the write update data be infected with malicious software, the read operation does not come into contact with the infected update data.

Still further, should the contaminated temporary copy subfile be quarantined, the original file and its corresponding original subfile may remain free of quarantine since their integrity has been preserved. Accordingly, access to the original file and its corresponding original subfile may optionally continue since they remain uncontaminated and unquarantined.

As used herein, the terms "scan", "anti-virus (AV) scan" and anti-virus (AV) program" refer to scans and programs for detecting any malicious software including but not limited to computer viruses. The term "repair" refers to processing an infected file detected to be infected with malicious software, to eliminate or render harmless the malicious software. The term "quarantining" refers to restricting or completely blocking access to an infected file which has been quarantined to eliminate or inhibit the spread of the malicious software from the infected file.

FIG. 1 is a schematic block diagram illustrating one embodiment of a data processing system 100 which provides for file integrity preservation in accordance with one embodiment of the present description. The system 100 includes a plurality of servers 110 as represented by the servers 110a-110d that may scan files or provide a host function, or both. In addition, the system 100 includes a network 120 and a storage system. The network 120 may be the Internet, a router, a wide area network, a local area network, or the like. The storage system includes a first bus 125, a second bus 150, and one or more storage servers 130 as represented by the servers 130a, 130b, which provide a data storage function in connection with one or more storage subsystems 140 as represented by the storage subsystems 140a, 140b, 140c. In one embodiment, one or more servers 110 as represented by the servers 110e, 110f are included in the storage sub system.

One or more servers as represented by the servers 110a, 110b, for example, may provide a host function to store data to and retrieve data from the storage system 180. In some storage systems, an anti-virus (AV) program runs external to the servers performing the storage function. Thus, the anti-virus software can be run on one or more dedicated servers such as the servers 110c and 110d, for example which are external to the storage system 180, or servers 110e, 110f, for example, which are internal to the storage system 180, to validate that the data contained within a storage unit of the storage system 180 is virus free. To speed the scanning of files and to provide for continued use of files, particularly large files while they are being scanned, it is known to subdivide a file into subfiles and to distribute the scanning of the subfiles to different servers so that the various subfiles of a particular file may be scanned by different servers operating in parallel or at different times. In addition, subfiles of a file may be accessed while other subfiles of the file are being scanned.

Previously, a storage system typically provided real time scan "on write" operations. For example, in connection with a write operation, the write data provided by a host server 110a, 110b was previously committed directly to the targeted file, and an AV Scan was initiated on the updated targeted file in which typically the entire file was scanned after the write operation. If the last write command introduced malicious software, and the AV Scan detected it, a repair of the infected file was attempted. If the repair of the infected file failed, the infected file was typically quarantined, blocking access to the quarantined file. In some prior systems, an entire file which may be a terabyte in size or larger, may be quarantined notwithstanding that only a relatively small portion of the file is actually infected.

As previously mentioned, in accordance with one aspect of the present description, file integrity may be preserved by subdividing a file into a plurality of subfiles, and directing a write update intended for a portion of that file to a temporary copy subfile instead. The temporary copy subfile is a copy of the original portion of the file which was the target of the write operation. As a result, malicious software if contained within the write update data would contaminate the temporary copy subfile rather than the original targeted file or its subfiles. In this manner, quarantining of either the original file or its original subfile may be avoided.

In addition, it is recognized herein that previously an anti-virus scan may have been insufficient to protect a file in the event that a "read" operation and a "write" operation occurred at the same time. For example, in many prior systems, an AV Scan had typically been initiated only on an "open for read" operation or a "close after a write" operation. Accordingly, an AV Scan was frequently not initiated on every read operation. As a result, if a process opened a file for a read operation while another process was writing to the same file and the write operation introduced malicious software, the read process in a prior storage system might have read that introduced virus before the AV scan and any subsequent repair or quarantine were completed.

As previously mentioned, in accordance with one aspect of the present description, file integrity may be preserved by subdividing a file into a plurality of subfiles, and directing a write update originally targeting a portion of that file to a temporary copy subfile instead to the original file itself or its subfile. Accordingly if a process opens a file for a read operation while another process is writing infected data which had been originally targeted for the same file, as a result of file integrity preservation in accordance with the present description, the read process would not encounter that malicious software in the original file or its subfiles since any malicious software would be introduced to the temporary copy subfile rather than to the original file which is being read.

Each storage subsystem 140 of FIG. 1 may include one or more controllers 160 that control one or more storage devices 170. The storage devices 170 may be hard disk drives, optical storage devices, micromechanical storage devices, semiconductor storage devices, and the like. Storage servers 130 may manage and control the storage system 180. The storage servers 130 may communicate with the network 120 and the storage subsystems 140 through the first bus 125 and second bus 150 respectively.

The storage devices 170 may store files, directory information, metadata, and the like, referred to hereafter as files. The servers 110e, 110f may scan the files for the purpose of detecting and mitigating any malware that may be stored in a file. The servers 110 may be external to the storage system 180 and/or internal to the storage system 180 as described above.

Files in the storage system 180 can grow to various sizes; very small to very large file sizes can exist. Scanning such large files with a single server 110 in some systems may require an inordinate amount of time. In addition, a large file that is being scanned may be inaccessible during the long scan time. Having a file inaccessible for such a long period of time is burdensome for important files. As previously mentioned, to speed the scanning of files and to provide for continued use of files, particularly large files, it has been known to subdivide a file into subfiles and to distribute the scanning of the subfiles to different servers so that the various subfiles of a particular file may be scanned by different servers operating in parallel or at different times.

Figure 2:
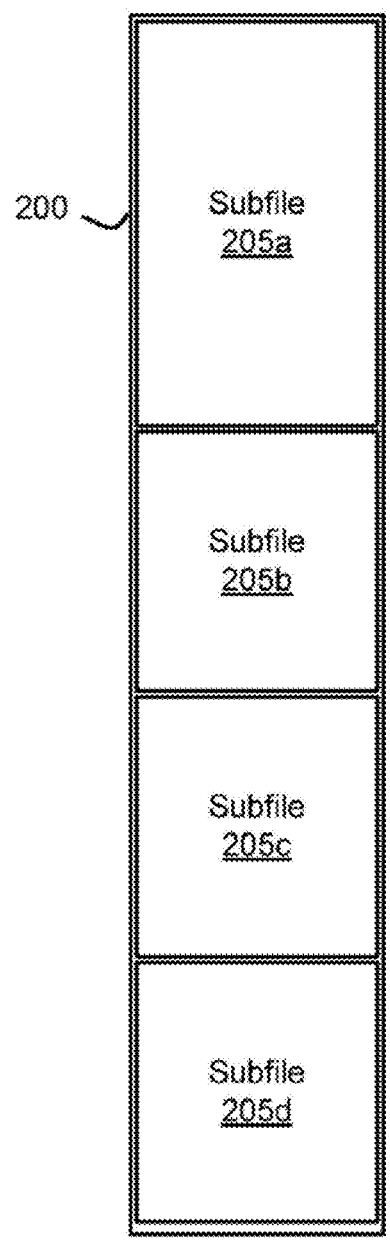
FIG. 2 is a schematic block diagram illustrating one embodiment of a file subdivided for file integrity preservation in accordance with the present description.

FIG. 2 is a schematic block diagram illustrating one embodiment of a file 200, the integrity of which may be preserved in accordance with the present description. The file 200 may be stored in the storage system 180 of FIG. 1, for example. As previously mentioned, a file such as the file 200 may be quite large. For example, in one embodiment, the file 200 may have a size in excess of 1 Terabyte (TB). Here, the file 200 is divided into a plurality of subfiles 205 as represented by the subfiles 205a, 205b, 205c, 205d . . . . In one embodiment, each subfile 205 is no larger than a specified size. The specified size may vary in range, such as 1 Megabyte (MB) to 1 Gigabyte (GB), for example. In another example, the file 200 may be divided so that each subfile 205 is no larger than a specified size of 10 GB. It is appreciated that the size of a subfile may vary, depending upon the particular application. This subdivision process may be initiated multiple times until the entire file scan is completed by the prior subdivided file scanning procedure.

Figure 3:
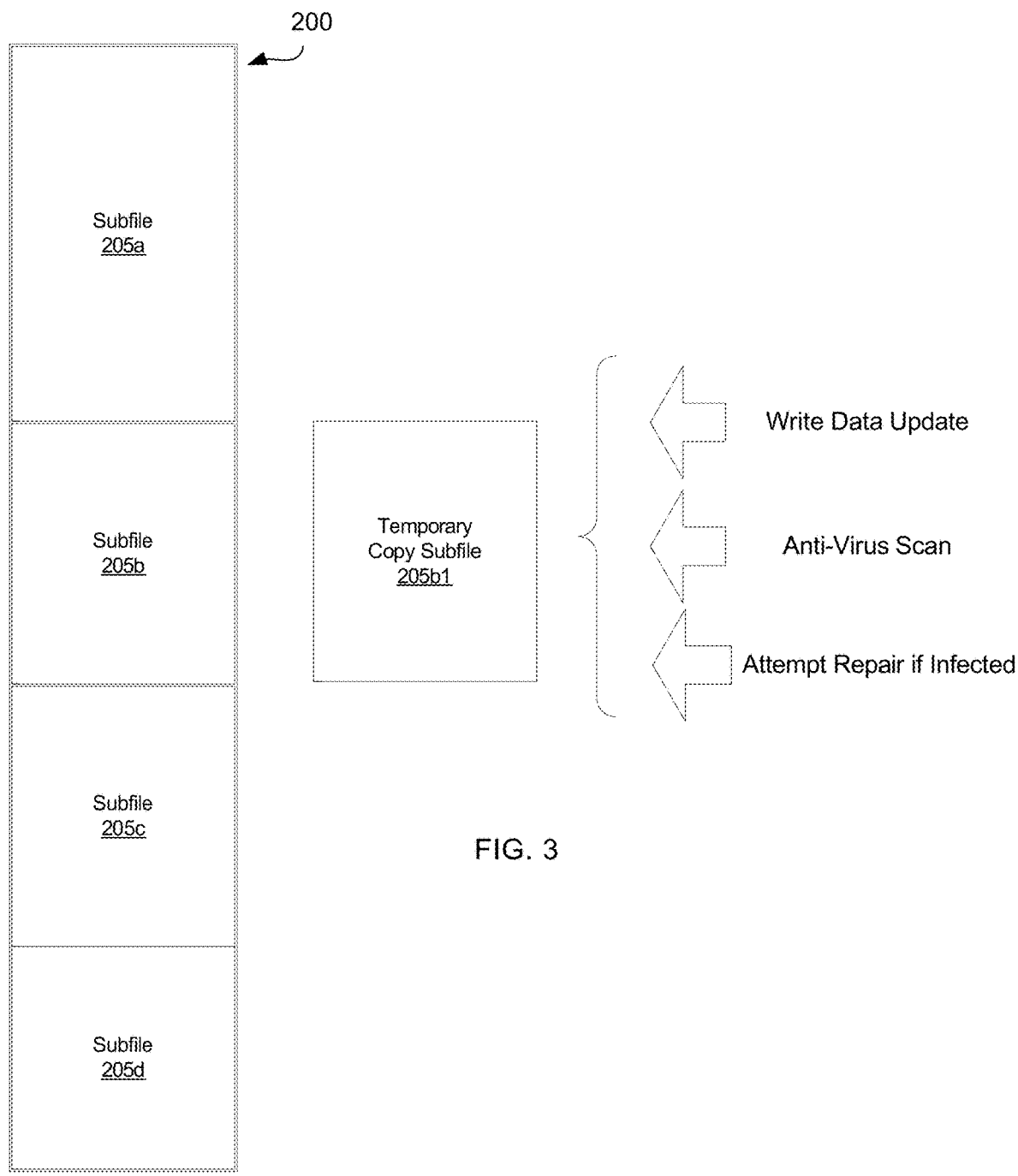
FIG. 3 is a schematic block diagram illustrating one embodiment of updating a temporary copy subfile for file integrity preservation in accordance with the present description.

In accordance with one aspect of the present description, division of files into subfiles may be utilized for preservation of file integrity by redirecting a write update targeting, that is intended for, a portion of a particular file, to a temporary copy subfile containing a copy of the targeted portion of the original file. FIG. 3 shows an example of such file integrity preservation in connection with a write update operation for write update data sent by a host server such as the host server 110a. The write update data from the host server 110a targets data contained within a subfile 205b of the file 200. Instead of immediately committing the write update data to the targeted original subfile 205b of the file 200, a first temporary copy subfile 205b1 corresponding to the first original subfile 205b is created and the contents of the original subfile 205b are copied over to the temporary copy subfile 205b1.

In one embodiment, a temporary copy subfile such as the temporary copy subfile 205b1 (FIG. 3) may be created by obtaining a temporary memory location for the particular temporary copy subfile from a pool 210 (FIG. 4) of available temporary locations 210a, 210b, 210c . . . . In this example, the pool of available temporary locations 210a, 210b, 210c are provided by disk drive storage locations. However, it is appreciated that in other embodiments, the pool of available temporary locations 210a, 210b, 210c may be provided by volatile or nonvolatile memory or by storage locations provided by other types of storage devices, depending upon the particular application.

In one embodiment, file integrity preservation in accordance with the present description may be invoked with a command line interface (CLI) command having a suitable name such as "Preserve File Integrity on Write" for example. Upon invoking this command, to enable the file integrity preservation process for a particular file such as the file 200, the file integrity preservation process creates storage space as represented by pool 210 (FIG. 4) of available temporary locations 210a, 210b, 210c . . . using a storage controller 160 and the storage devices 170 to contain temporary copy subfiles for the file 200. In one embodiment, the size of the pool 210 may be dependent upon the size of the file 200 for which the file integrity preservation command was invoked, and the frequency of write updates to the file 200. It is appreciated that the size of the pool 210 may vary, depending upon the particular application.

In this example, the temporary copy subfile 205b1 is created using an available temporary copy subfile location 210b of the pool 210 of available temporary locations. Accordingly a data structure for the temporary copy subfile 205b1 has a file location pointer (as represented by an arrow 212a) pointing to the temporary copy subfile location 210b of the pool 210 of available temporary locations, as the location of the temporary copy subfile 205b1. The contents of the targeted original subfile 205b are copied over to the location of the temporary copy subfile 205b1 so that the temporary copy subfile 205b1 corresponds to the targeted original subfile 205b.

When a host sends a "write command" to update a file, and the CLI command "Preserve File Integrity on Write" is enabled on the file, the write data associated with the "write command" is committed to the temporary copy subfile in the storage location instead of the original file. Thus, in this example, once the temporary copy subfile 205b1 corresponding to the targeted original subfile 205b is available, the write update data received for the write operation and intended for the original subfile 205b, is committed to update the temporary copy subfile 205b1 as indicated by the Write Data Update process arrow of FIG. 3, instead of being committed to update the original subfile 205*b*. As a consequence, the temporary copy subfile 205*b*1 which is updated with the write data, may be scanned for malicious software as indicated by the Anti-Virus Scan process arrow of FIG. 3, separately from the original file 200 and its corresponding original subfile 205*b*. Accordingly, in one embodiment, access to the original file 200 including the corresponding original subfile 205*b*, may be permitted while the temporary copy subfile 205*b*1 is updated and scanned.

Figure 4:
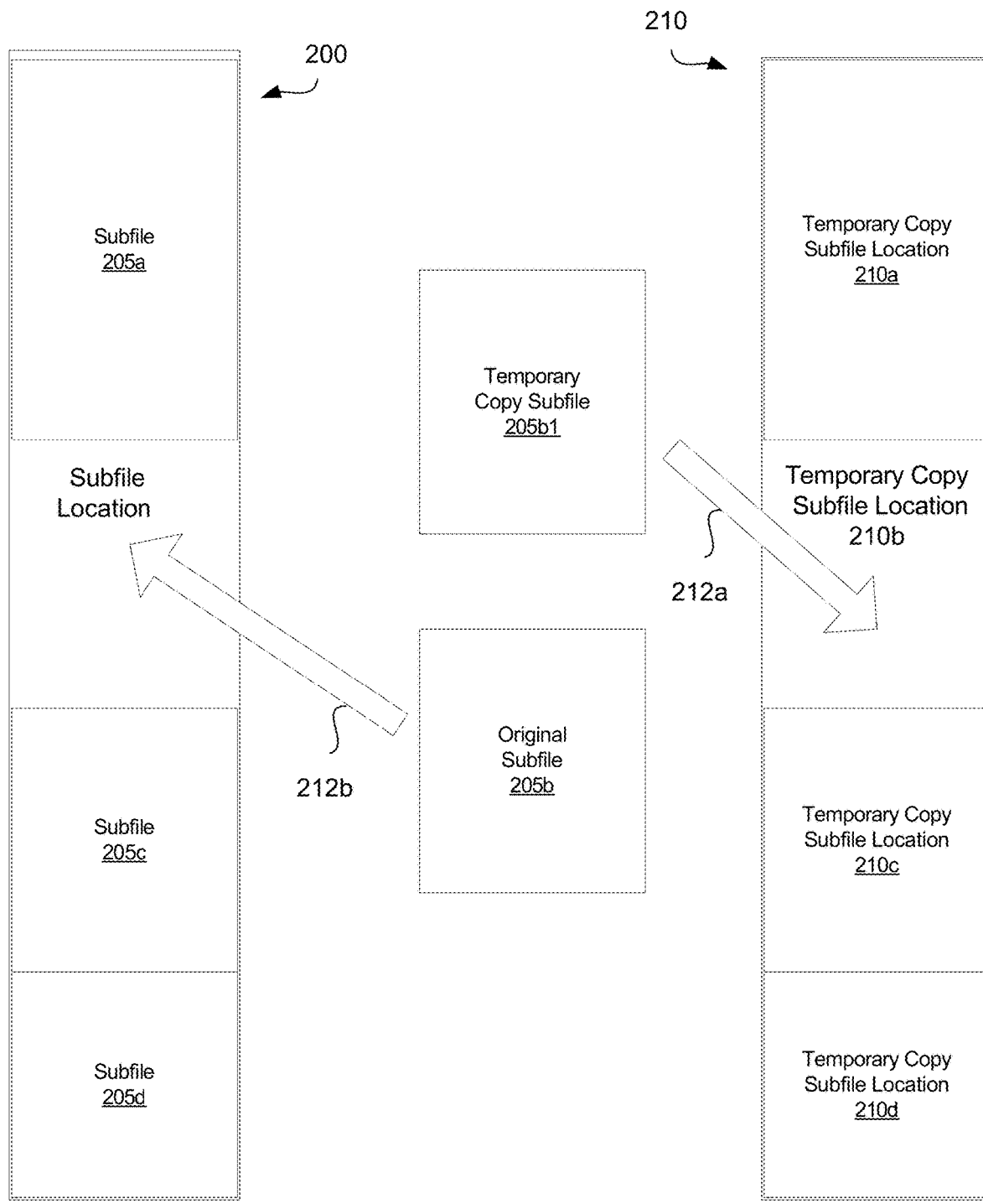
FIG. 4 is a schematic block diagram illustrating one embodiment of creating a temporary copy subfile for file integrity preservation in accordance with the present description.
Figure 5:
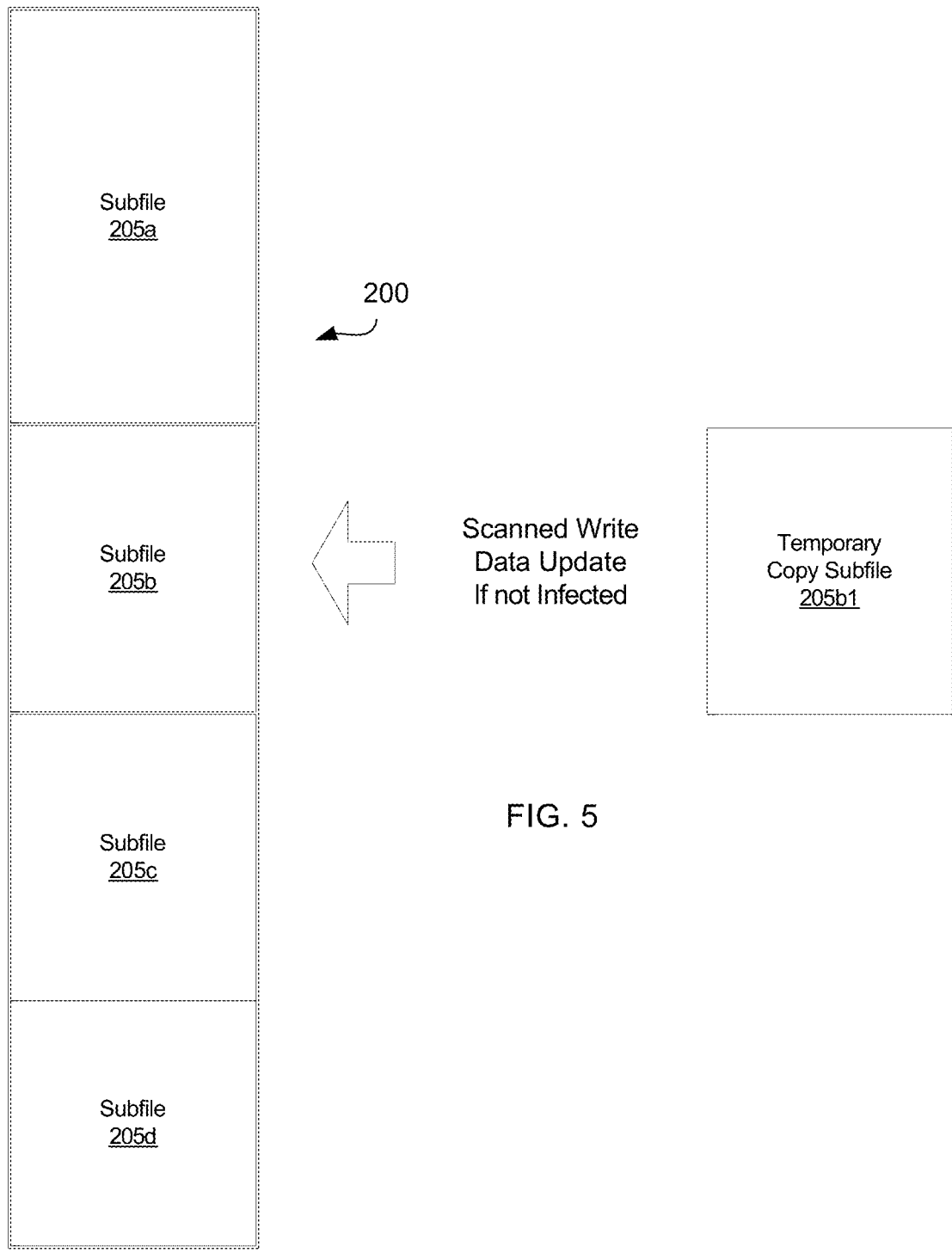
FIG. 5 is a schematic block diagram illustrating one embodiment of updating the originally targeted subfile for file integrity preservation in accordance with the present description.

If the temporary copy subfile 205*b*1 passes the scanning test, the original file 200 may be updated with the scanned and updated contents of the clean temporary copy subfile 205*b*1 as indicated by the Scanned Write Data Update If not Infected process arrow of FIG. 5. In one embodiment, the original file 200 may be updated by copying the scanned, updated contents from the temporary location 210*b* (FIG. 4) of the temporary copy subfile 205*b*1 to the location of the targeted original subfile 205*b*. Upon successful updating of the original file 200 with the scanned, updated contents of the temporary copy subfile 205*b*1, the temporary memory or storage space utilized by the temporary copy subfile 205*b* may be released for use by other processes. Thus, the temporary copy subfile location 210*b* may be released and returned to the pool 210 of temporary copy subfile locations.

Figure 6:
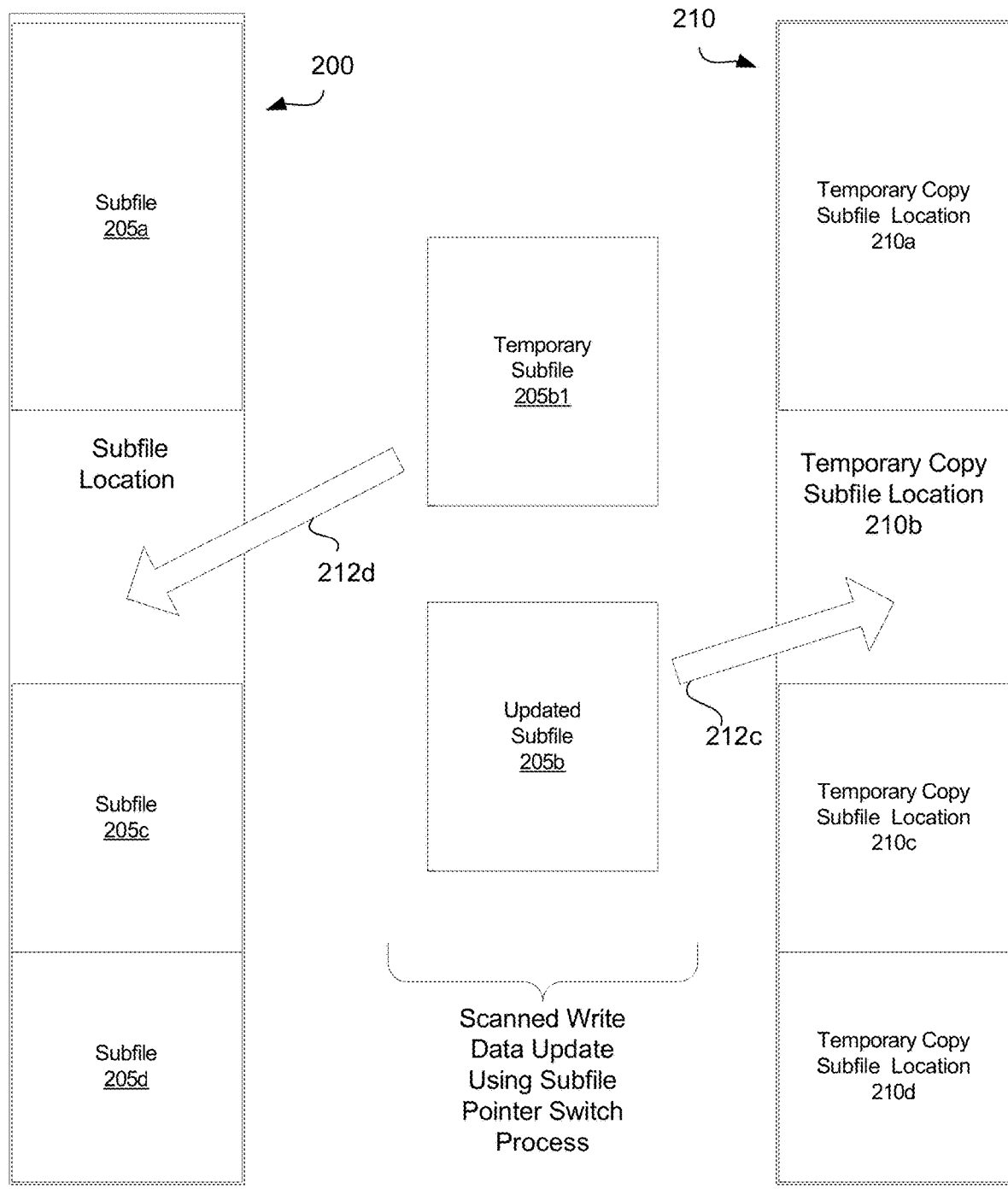
FIG. 6 is a schematic block diagram illustrating another aspect of updating an originally targeted subfile for file integrity preservation in accordance with the present description.

Another example of a technique for updating the original file 200 with the scanned, updated contents of the temporary copy subfile 205*b*1 is referred to herein as a switch subfile pointer process and is described in connection with FIG. 6 below. It is appreciated that the original file 200 may be updated with clean update data from the temporary copy subfile 205*b*1 using other techniques, depending upon the particular application.

As previously mentioned in connection with FIG. 4, the temporary copy subfile 205*b*1 has a file location pointer (as represented by an arrow 212*a*) pointing to the temporary copy subfile location 210*b* of the pool 210 of available temporary locations, as the location of the temporary copy subfile 205*b*1. Similarly, the targeted original subfile 205*b* has a file location pointer (as represented by an arrow 212*b*) pointing to the original subfile location within the file 200, as the location of the targeted original subfile 205*b*. Instead of copying the data of the updated and scanned temporary subfile 205*b*1 from the temporary copy subfile location 210*b* of the pool to the targeted original subfile 205*b* at its original location within the file 200, the file pointers of the temporary copy subfile 205*b*1 and the targeted original subfile 205*b* may be updated by switching them as depicted in FIG. 6.

Once switched, the targeted original subfile 205*b* has a file location pointer (as represented by an arrow 212*c*) pointing to the temporary copy subfile location 210*b* of the pool 210 of available temporary locations, as the location of the targeted original subfile 205*b*, since the temporary copy subfile location 210*b* contained the updated data which has been scanned and confirmed as free from malicious software as described above. In this manner, the targeted original subfile 205*b* of the file 200 may be updated with the scanned write update data without actually copying it from the temporary copy subfile 205*b*1 to the original subfile 205*b*. Similarly, once switched, the temporary copy subfile 205*b*1 has a file location pointer (as represented by an arrow 212*d*) pointing to the original subfile location within the file 200, as the location of the temporary subfile 205*b*1. This location may now be released to the pool 210 of temporary copy subfile locations.

In this manner, updating the original targeted subfile 205*b* with the updated and scanned contents of the temporary copy subfile 205*b*1 includes updating a file pointer for the original targeted subfile 205*b* to identify the temporary copy subfile location 210*b* of the temporary copy subfile 205*b*1 as the location of original targeted subfile 205*b* instead of identifying the original location within the file 200 as the location of the original targeted subfile 205*b*. Furthermore, updating the pool pointer for the temporary copy subfile 205*b*1 to identify the location of the temporary copy subfile 205*b*1 as the original location targeted subfile 205*b* within the file 200 instead of identifying the original temporary copy subfile location 210*b* of the temporary copy subfile 205*b*1. In some embodiments, updating file pointers in accordance with the process described herein may be achieved more quickly and efficiently as compared to copying the scanned updated data from the temporary copy subfile to the original subfile.

Conversely, in the event that the AV scan reveals that the write update introduced malicious software to the temporary copy subfile 205*b*1, the original file 200 and its corresponding targeted original subfile 205*b* remain uncontaminated by the write update. Accordingly, access to the original file 200 and its corresponding original subfile 205*b* may continue since they remain uncontaminated and their integrity has been preserved.

An attempt may be made to repair the infected temporary copy subfile 205*b*1 as indicated by the Attempt Repair if Infected process arrow of FIG. 3. The temporary copy subfile 205*b*1 which had been updated with the write data, may be rescanned for malicious software following the repair attempt as represented by the Anti-Virus Scan process arrow of FIG. 3, again separately from the original file 200 and its corresponding original subfile 205*b*.

Figure 7:
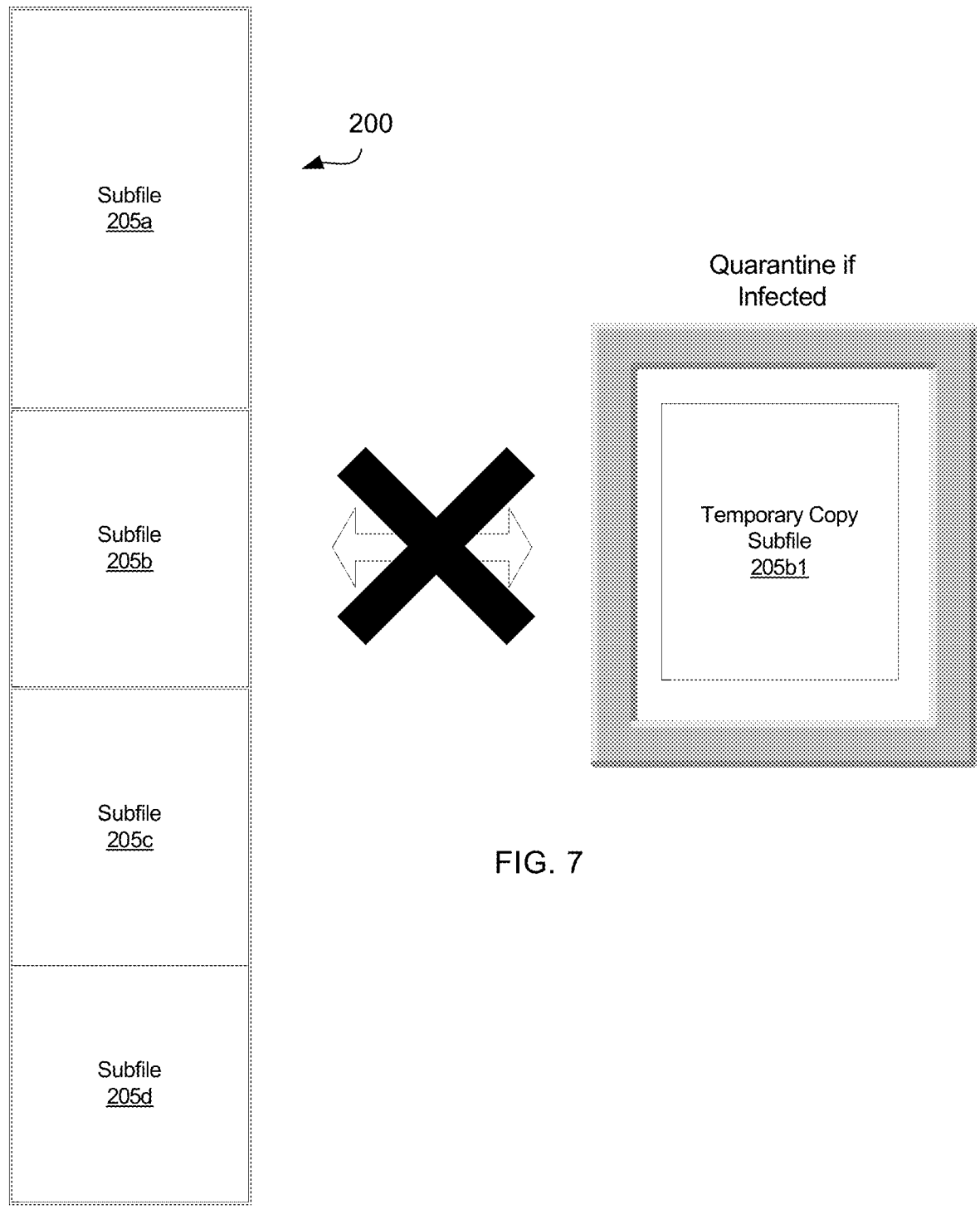
FIG. 7 is a schematic block diagram illustrating one embodiment of quarantining of a temporary copy subfile for file integrity preservation in accordance with the present description.

If the repaired temporary copy subfile 205*b*1 passes the rescanning test, the original file 200 may be updated with the rescanned and updated contents of the clean temporary copy subfile 205*b*1 as indicated by the Scanned Write Data Update If not Infected process arrow of FIG. 5 using update techniques such as those described above. Conversely, in the event that the AV rescan reveals that the repair of the temporary copy subfile 205*b*1 failed such that the temporary copy subfile 205*b*1 remains contaminated from the write update, the temporary copy subfile 205*b*1 may be quarantined as represented in FIG. 7. As a result, the storage space 210*b* (FIG. 4) occupied by the quarantined temporary subfile 205*b*1 is marked unavailable for use. It is appreciated that the number of repair attempts and failed rescans before the temporary copy subfile is quarantined may vary, depending upon the particular application.

Still further, should the contaminated temporary copy subfile 205*b*1 be quarantined, the original file 200 and its corresponding original subfile 205*b* may remain free of quarantine as shown in FIG. 7 since their integrity has been preserved because the subfile 205*b*1 in the temporary location is in a quarantined state and has not been committed to a location within the file 200. Accordingly, access to the original file 200 and its corresponding original subfile 205*b*1 continues since they remain uncontaminated and unquarantined.

Figure 8:
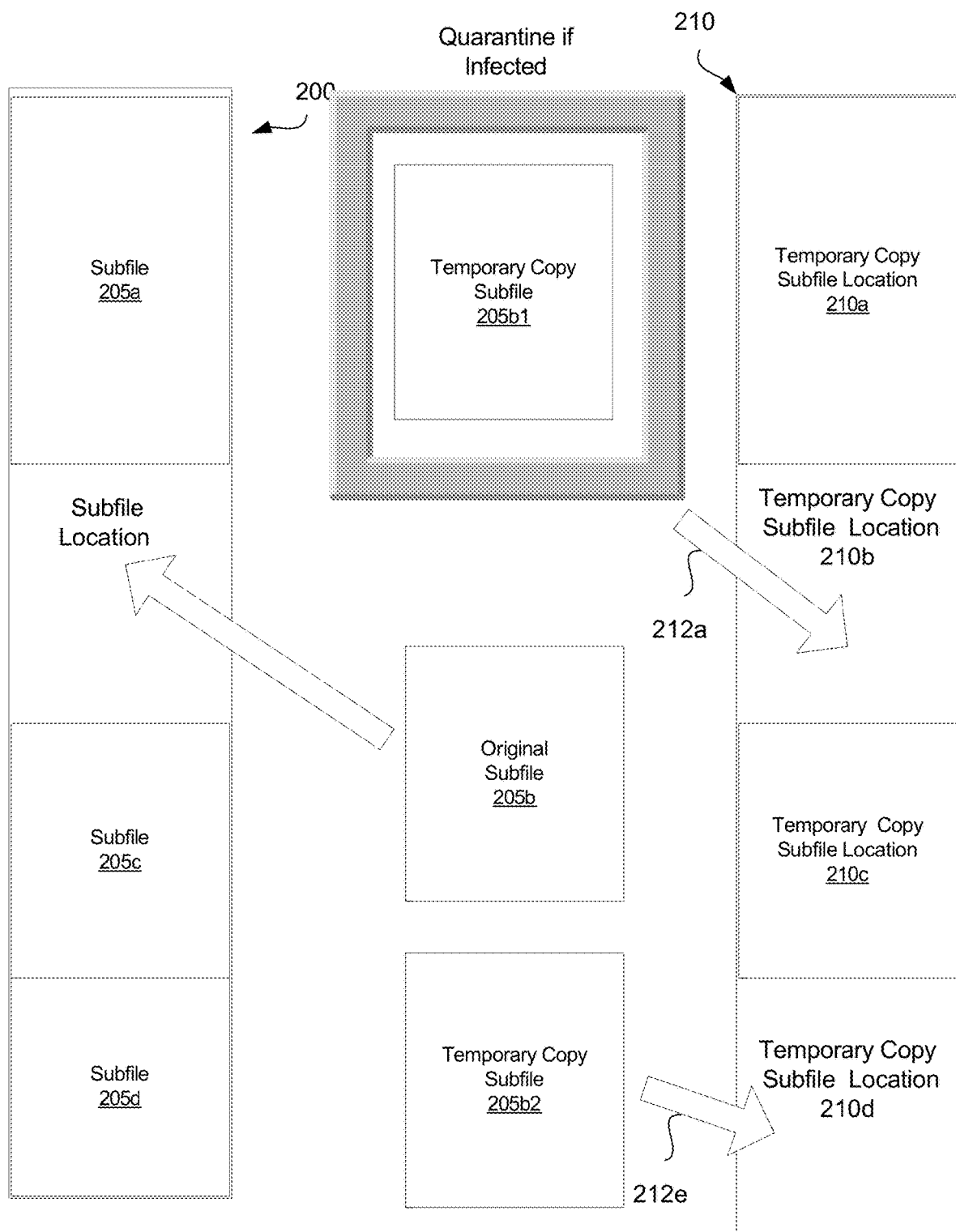
FIG. 8 is a schematic block diagram illustrating one embodiment of creating a second temporary copy subfile for file integrity preservation in accordance with the present description.

However, upon quarantining the temporary copy subfile 205*b*1, the file 200 will not contain the latest updates represented by the quarantined write update data. In one embodiment, the original host server 110*a* which provided the original write update data may be requested to resend the write update data. In another aspect of the present description, in the event that the first temporary copy subfile 205*b*1 is quarantined, a second temporary copy subfile as represented by the temporary copy subfile 205*b*2 (FIG. 8) may be created. In one embodiment, a second temporary copy subfile such as the temporary copy subfile 205*b*2 (FIG. 8) may be created by obtaining a temporary storage location in a manner similar to that described above in connection with temporary copy subfile 205*b*1. In this example, the temporary copy subfile 205*b*2 is created using an available temporary copy subfile location 210*d* of the pool 210 of available temporary locations. Accordingly a data structure for the temporary copy subfile 205*b*2 has a file location pointer (as represented by an arrow 212*e*) pointing to the temporary copy subfile location 210*d* of the pool 210 of available temporary locations, as the location of the temporary copy subfile 205*b*2. The contents of the targeted original subfile 205*b* are copied over to the location of the temporary copy subfile 205*b*2 so that the temporary copy subfile 205*b*2 corresponds to the targeted original subfile 205*b* in the same manner as the first temporary copy subfile 205*b*1.

Once the temporary copy subfile 205*b*2 corresponding to the targeted original subfile 205*b* is available, the write update data resent by the original host server 110*a* for the write operation intended for the original subfile 205*b*, is committed to update the temporary copy subfile 205*b*2 in the same manner as described above in connection with temporary copy subfile 205*b*1. Accordingly, the temporary copy subfile 205*b*2 which is updated with the write data, may be scanned for malicious software in the same manner as described above in connection with temporary copy subfile 205*b*1.

If the temporary copy subfile 205*b*2 passes the scanning test, the original file 200 may be updated with the scanned and updated contents of the clean temporary copy subfile 205*b*2 in the manner described above in connection with temporary copy subfile 205*b*1. Upon successful updating of the original file 200 with the scanned, updated contents of the temporary copy subfile 205*b*2, the temporary memory or storage space utilized by the temporary copy subfile 205*b*2 may be released and returned to the pool 210 of temporary copy subfile locations.

Conversely, in the event that the AV scan reveals that the resent write update again introduced malicious software, this time to the temporary copy subfile 205*b*2, an attempt may be made to repair and rescan the infected temporary copy subfile 205*b*1 one or more times as described above in connection with temporary copy subfile 205*b*. If the write update data that was resent is once again quarantined, then the file 200 may be marked with a suitable indication such as "not up to date," for example, to indicate that the particular file area (in this example, subfile 205*b*) was not updated. In this example, the user may also be informed that the particular file area (in this example, subfile 205*b*) was not updated, and that the temporary copy subfiles 205*b*1 and 205*b*2 have been quarantined. In addition, the original host server (host server 110*a* in this example) may be requested to not resend the particular write update data which was found to contain malicious software and which could not be repaired as discussed above. Further in one embodiment, any subsequent write updates from the same host (host server 110*a* in this example) to the same subfile (in this example, subfile 205*b*) may be rejected.

In another aspect of the present description, once the user has been informed that subfile 205*b* has not been updated and has been informed of the quarantining of the temporary copy subfiles 205*b*1, 205*b*2, the user may select to delete the quarantined subfile data of the quarantined subfiles 205*b*1, 205*b*2. If so, the infected storage locations 210*b*, 210*d* are cleared, and another AV Scan is performed on those areas. If a storage location which previously contained a quarantined temporary copy subfile is found to be free of malicious software, the storage location may be returned to the pool 210 of temporary storage locations. In addition, in one embodiment, the subsequent write updates from the same host (host server 110*a* in this example) to the previously subfile 205*b* for which temporary copy subfiles 205*b*1, 205*b*2 were quarantined, may be accepted.

It is seen from the above that a host that sends an "open read" command for the file receives the file data that is virus free. As previously stated, the host will be notified that the file contains an area (subfile in this example) that did not get updated due to a virus detection. As in current art, since the file was not updated, an "open read" command from a host will not cause an AV scan if the AV scan engines have not been updated with new AV software.

As previously mentioned, upon quarantining the first temporary copy subfile 205*b*1, the file 200 will not contain the latest updates represented by the quarantined write update data. In another embodiment, the original host server 110*a* which provided the original write update data may be requested to not send write update data to the subfile 205*b*. Instead, a second host such as the host server 110*b*, for example, may be requested to provide the write update data targeted to update the subfile 205*b*. In this example, the write update data provided by the second host server 110*b* may be the same as that provided by the first host server 110*a*, but may be free of malicious software.

Accordingly, in this example, in the event that the first temporary copy subfile 205*b*1 is quarantined, a second temporary copy subfile as represented by the temporary copy subfile 205*b*2 (FIG. 8) may be created to receive the write update data from the second host server 110*b* in a manner similar to that described above in connection with the first host server 110*a*. If the temporary copy subfile 205*b*2 containing the write update data from the second host server 110*b* passes the scanning test, the original file 200 may be updated with the scanned and updated contents of the clean temporary copy subfile 205*b*2 in the manner described above in connection with temporary copy subfile 205*b*1. Upon successful updating of the original file 200 with the scanned, updated contents of the temporary copy subfile 205*b*2, the temporary memory or storage space utilized by the temporary copy subfile 205*b*2 may be released and returned to the pool 210 of temporary copy subfile locations. In addition, the first host server 110*a* may be permitted to resume sending subsequent write updates targeted for the subfile 205*b*.

Conversely if the write update data that was sent by the second host server 110*b* is also quarantined, then the file 200 may be marked with a suitable indication such as "not up to date," for example, to indicate the particular file area (in this example, subfile 205*b*) which was not updated. In this example, the user may also be informed that the particular file area (in this example, subfile 205*b*) was not updated, and that the temporary copy subfiles 205*b*1 and 205*b*2 have been quarantined. In addition, the second host server (host server 110*b* in this example) may be requested to not resend the particular write update data which was found to contain malicious software and which could not be repaired as discussed above. Further in one embodiment, any subsequent write updates from the same host (host server 110*b* in this example) to the same subfile (in this example, subfile 205*b*) may be rejected.

In another aspect of the present description, once the user has been informed that subfile 205*b* has not been updated and has been informed of the quarantining of the temporary copy subfiles 205*b*1, 205*b*2, the user may in this example as well select to delete the quarantined subfile data of the quarantined subfiles 205*b*1, 205*b*2. If so, the infected storage locations 210*b*, 210*d* are cleared, and another AV Scan is performed on those areas. If a storage location which previously contained a quarantined temporary copy subfile is found to be free of malicious software, the storage location may be returned to the pool 210 of temporary storage locations. In addition, in one embodiment, the subsequent write updates from the same hosts (host servers 110*a*, 110*b* in this example) targeted for the subfile 205*b* for which temporary copy subfiles 205*b*1, 205*b*2 were quarantined, would be accepted.

In one embodiment, the size of each subfile 205 may be selected to be proportional to the capacity of a server 110 scanning the subfiles such as the original subfile 205*b* and its corresponding temporary copy subfiles 205*b*1, 205*b*2, for example. The size may be fixed or may be dynamically assigned. It is appreciated that other sizes and other techniques for choosing the sizes of the subfiles may be utilized depending upon the particular application.

FIG. 9 is a schematic block diagram illustrating one embodiment of an anti-virus control file 302. The anti-virus control file 302 includes an entry 220 for each subfile original or temporary to be scanned. In one embodiment, each entry 220 includes a status 230, a server identifier 235, and a subfile address 240.

The status 230 may be selected from the group consisting of in-queue, quarantined, and cleared statuses. The in-queue status may indicate that an original or temporary copy subfile 205 is scheduled to be scanned by a server 110, but has not been found to be clear of malicious software. In one embodiment, subfiles 205 within the in-queue status may be accessed. Alternatively, subfiles 205 with the in-queue status may not be accessed. As used herein, accessed refers to a subfile 205 being read from and/or written to by an application, an operating system, or the like.

The quarantined status may indicate that malicious software has been found in the subfile 205. In one embodiment, subfiles 205 with a quarantined status may not be accessed. Subfiles 205 with the quarantined status may be scheduled for mitigation, deletion or other processing. The mitigation may include repair to delete malicious software from the subfile 205, overwriting the subfile 205 with a backup copy, and rebuilding the subfile 205 using error codes and/or redundant data, and the like.

The cleared status may indicate that the subfile 205 has been scanned and that no malicious software has been found. In one embodiment, subfiles 205 with a cleared status may be accessed. For example, if the first subfile 205*a* of a large database file 200 has been scanned and has a cleared status, the first subfile 205*a* may be accessed.

The server identifier 235 may identify the server 110 assigned to scan the subfile 205. In one embodiment, the server identifier 235 is a network address. Alternatively, the server identify 235 may be a logical name.

The subfile address 240 may include a start address and an end address for the subfile 250. In one embodiment, the subfile address 240 includes start addresses and end addresses for a plurality of segments that make up the subfile.

Figure 10:
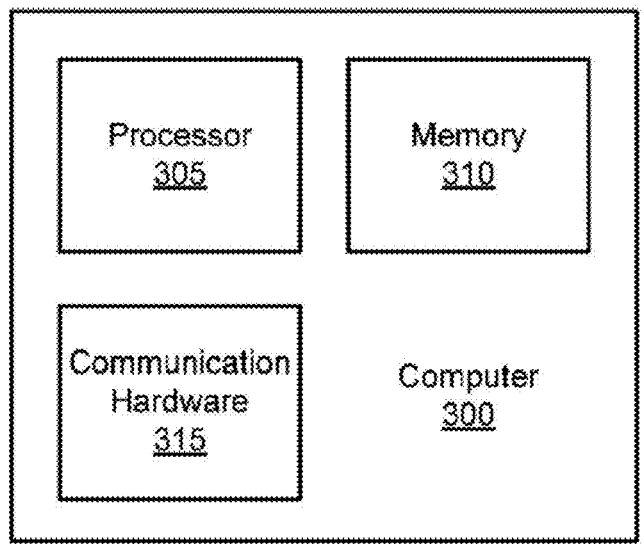
FIG. 10 is a schematic block diagram illustrating one embodiment of a computer which may be used for file integrity preservation in accordance with the present description.

FIG. 10 is a schematic block diagram illustrating one embodiment of a computer 300. The computer 300 may be the server 110. Alternatively, the computer 300 may be a storage server 130, a controller 160, or the like. The computer 300 may include a processor 305, a memory 310, and communication hardware 315. The memory 310 may be a semiconductor storage device, a hard disk drive, or the combinations thereof. The memory 310 may store computer readable program code. The processor 305 may execute the computer readable program code. The computer 300 may communicate with the external devices through the communication hardware 315.

Figure 11:
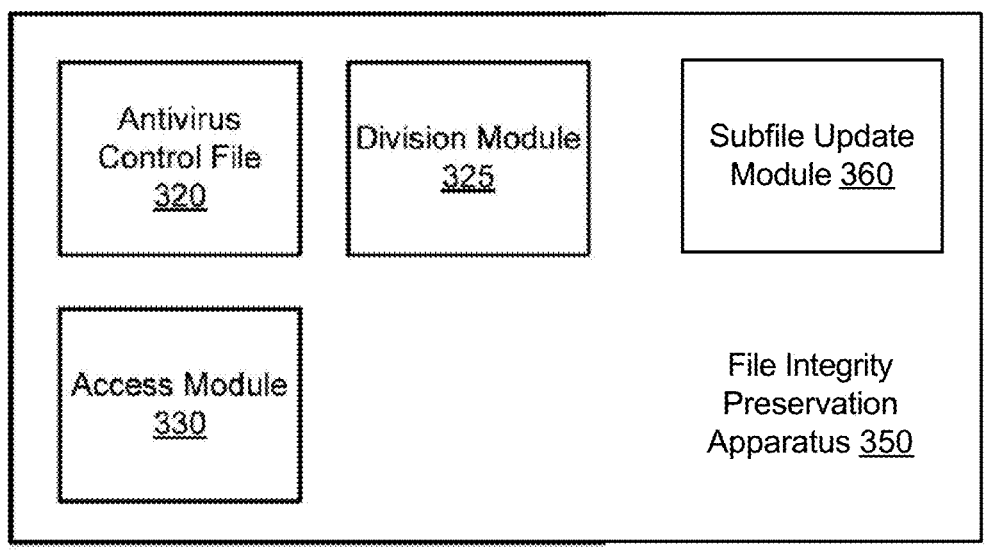
FIG. 11 is a schematic block diagram illustrating one embodiment of a file integrity preservation apparatus in accordance with the present description.

FIG. 11 is a schematic block diagram illustrating one embodiment of a file integrity preservation apparatus 350. The apparatus 350 may be embodied in the computer 300. The apparatus 350 includes an anti-virus control file 320, a division module 325, an access module 330 and a subfile update module 360.

In one embodiment. the anti-virus control file 320, the division module 325, the access module 330 and the subfile update module 360 may be embodied in a computer-readable storage medium storing computer readable program code. The computer readable storage medium may be the memory 310. The processor 305 may execute the computer readable program code to perform the functions of the anti-virus control file 320, the division module 325, the access module 330 and the subfile update module 360

The division module 325 may divide the file 200 into a plurality of subfiles 205 and create the temporary copy subfiles. The access module 330 may maintain a status of each subfile 205. In addition, the access module 330 may scan each subfile 205 with a separate server 110 as described herein. If the subfile passes the scan, the subfile update module 360 may update the subfile with the scanned update data.

Figure 12:
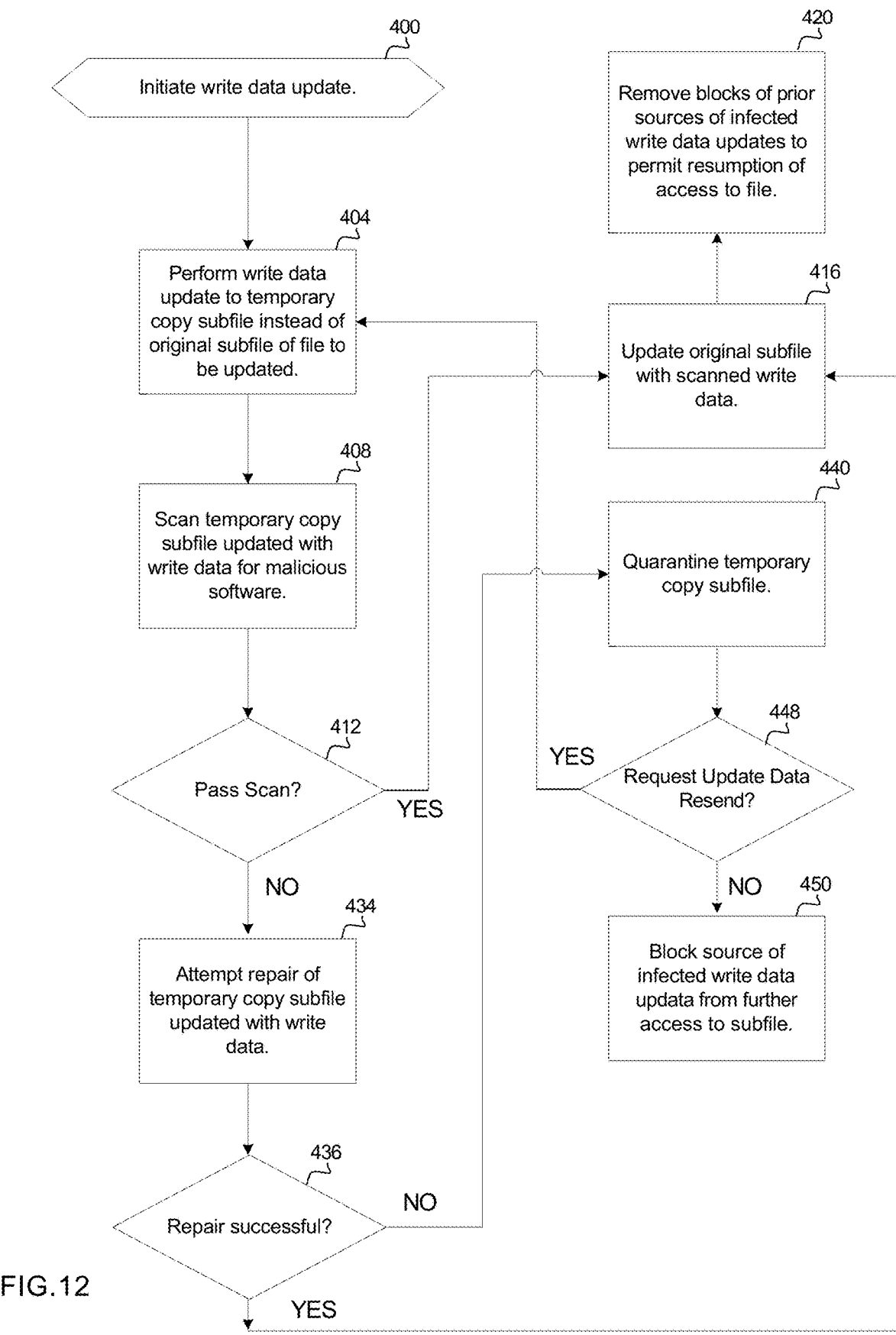
FIG. 12 depicts one embodiment of operations for file integrity preservation in accordance with the present description.

FIG. 12 shows one embodiment of operations for file integrity preservation in accordance with the present description. Upon the initiation of a write data update (block 400) in which a host provides write data targeted to update a portion of a file, the write data update is instead used to update (block 404) a temporary copy subfile corresponding to a subfile of the file containing the targeted portion of the write data operation. Upon updating the temporary copy subfile of the file with the write update, the updated temporary copy subfile is scanned (block 408) for malicious software. If the scanned, updated temporary copy subfile passes (block 412) the scan, the file or its original subfile may be updated (block 416) with the scanned, updated contents of the temporary copy subfile. In addition, any blocks applied to prior sources of infected write data for the subfile of the file may be removed (block 420) to permit resumption of access to the subfile for the previously blocked sources.

Conversely, if the updated, scanned temporary copy subfile fails (block 412) the scan such that the temporary copy subfile was found to be infected with malicious software, an attempt (block 434) may optionally be made to repair the scanned, updated temporary copy subfile found to be infected with malicious software. Upon completion of the repair attempt, the temporary copy subfile may be rescanned (block 436) to determine if the repair attempt was successful. If the temporary copy subfile fails the scan again, that is, the repair attempt was unsuccessful (block 436), the temporary copy subfile may be quarantined (block 440). In one embodiment, a determination may be made (block 448) as to whether to request a resending of the write update data. The request to resend the write update data may be made to the original source of the write update data or to a different source. If a resending of the write update data is requested and received, the resent write update data may be used to update (block 404) another temporary copy subfile and the operations of blocks 404-448 may be repeated.

If it is determined (block 448) that the resending of the write update data is not to be requested, the source of the infected write update data may be temporarily blocked (block 450) from further access to the subfile which was targeted by the write data update. In one embodiment, further operations may be performed as explained in greater detail in connection with FIG. 13 below.

If the repair attempt (block 434) allows the updated temporary copy subfile to pass (block 436) the scan, indicating that the repair was successful, the file or its original subfile may be updated (block 416) with the scanned, updated contents of the temporary copy subfile. In addition, any blocks applied to prior sources of infected write data for the subfile of the file may be removed (block 420) to permit resumption of access to the subfile for the previously blocked sources.

Figure 13:
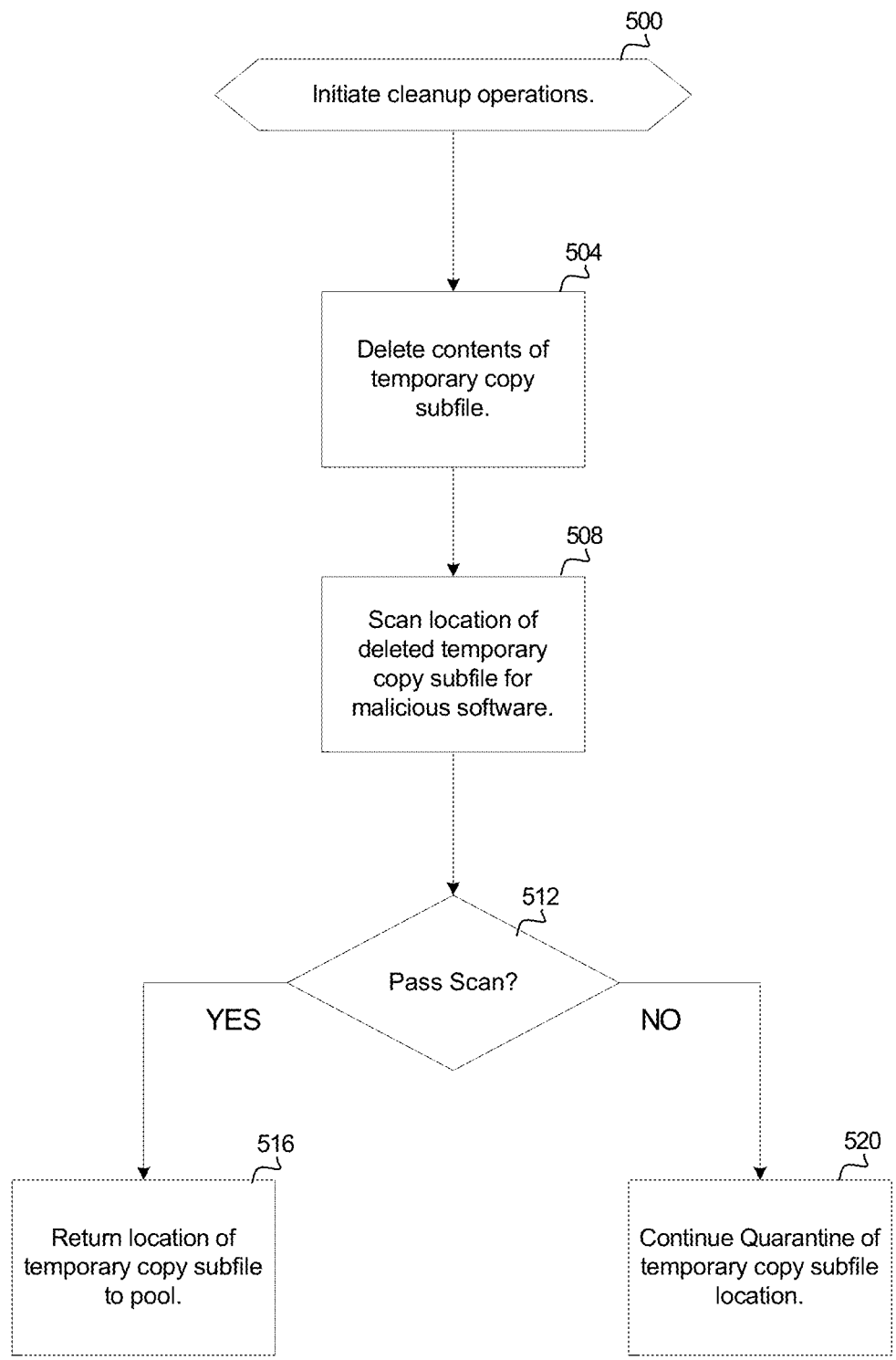
FIG. 13 depicts another embodiment of operations for file integrity preservation in accordance with the present description.

As previously mentioned, if a determination (block 448) is made to request no further resends of the write update data, a further operations may optionally be performed. FIG. 13 depicts one example of operations which may be initiated (block 500) subsequent to quarantining (block 440, FIG. 12) a temporary copy subfile. In one embodiment, further operations may include deleting (block 504) the contents of the quarantined temporary copy subfiles and scanning (block 508) the locations of the deleted temporary copy subfiles to ensure that they are free of malicious software. If so, the locations of the temporary copy subfiles may be returned (block 516) to a pool of temporary copy subfiles for use by other processes. Alternatively, if the scanning (block 508) of the locations of the deleted temporary copy subfile indicates that malicious software remains, the quarantining of the locations of the temporary copy subfile may continue (block 520). In some embodiments, one or more additional attempts may be made to clean the temporary copy subfile locations found to harbor malicious software.

Figure 14:
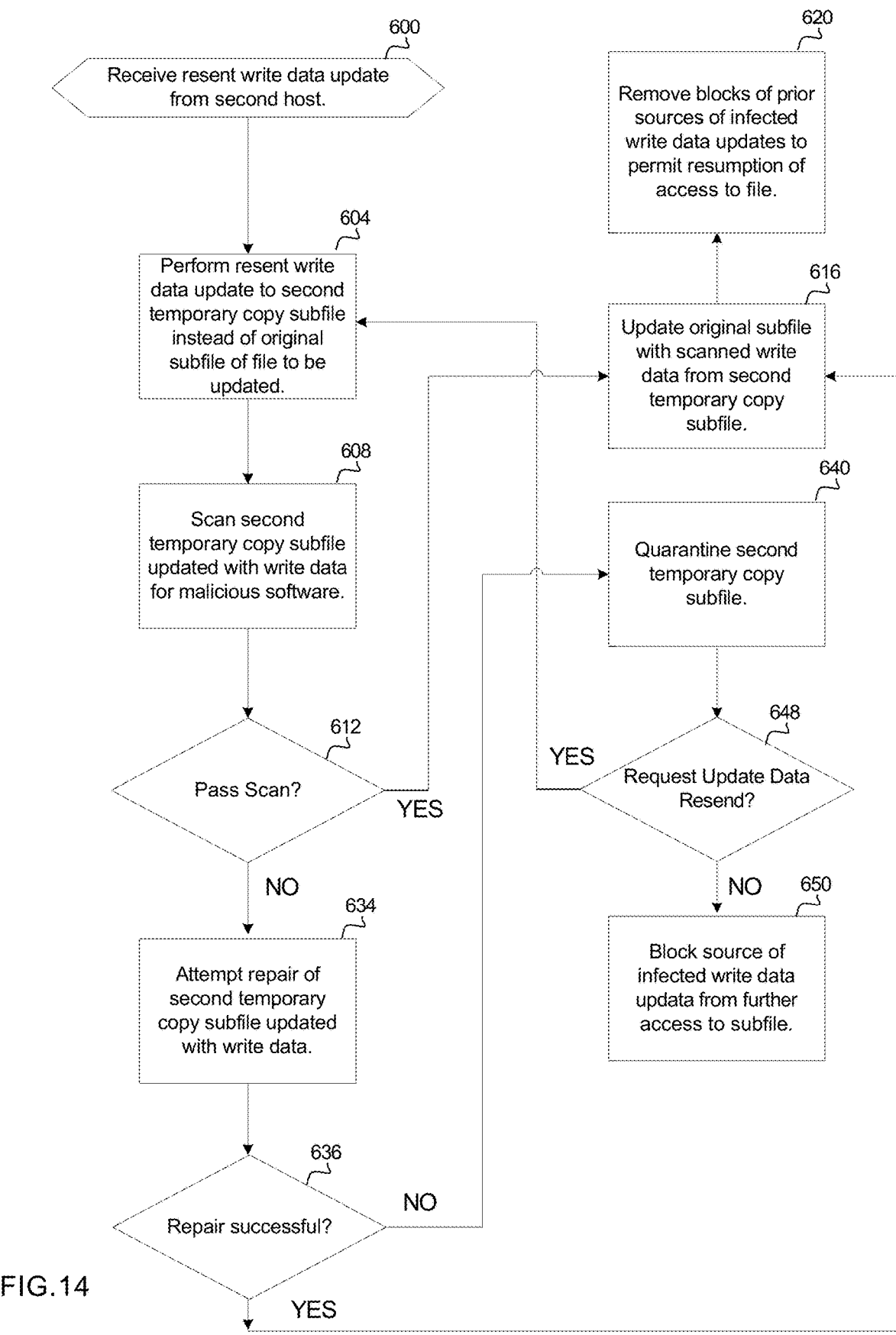
FIG. 14 depicts still another embodiment of operations for file integrity preservation in accordance with the present description.

As previously mentioned in connection with FIG. 12, in the event that a temporary copy subfile is quarantined (block 440, FIG. 12), a determination may be made (block 448) as to whether to request a resending of the write update data. FIG. 14 is directed to an embodiment in which the request to resend the write update data is made to a source other than the original source of the write update data.

In this embodiment, the resent write update data from the second source may be used to update (block 404, FIG. 12) another temporary copy subfile instead of the original targeted subfile 205*b* (FIG. 8) of the original file 200 and the operations of blocks 404-448 (FIG. 12) may be repeated with respect to the second temporary copy subfile. Accordingly, upon receipt (block 600) of the resent write update data from a second host, the resent update data intended to update the subfile 205*b*, is instead used to update (block 604) a second temporary copy subfile 205*b*2 corresponding to the subfile 205*b* of the file 200 containing the targeted portion of the write data operation. Upon updating the second temporary copy subfile of the file with the write update, the updated second temporary copy subfile is scanned (block 608) for malicious software. If the scanned, updated second temporary copy subfile passes (block 612) the scan, the file 200 or its original subfile 205*b* may be updated (block 616) with the scanned, updated contents of the second temporary copy subfile. In addition, any blocks applied to prior sources such as the original source of the infected write data for the subfile of the file may be removed (block 620) to permit resumption of access to the subfile for the previously blocked sources.

Conversely, if the updated, scanned second temporary copy subfile 205*b*2 fails (block 612) the scan such that the second temporary copy subfile was found to be infected with malicious software, an attempt (block 634) may be made to repair the scanned, updated second temporary copy subfile found to be infected with malicious software. Upon completion of the repair attempt, the second temporary copy subfile may be rescanned (block 636) to determine if the repair attempt was successful. If the second temporary copy subfile fails the scan again, that is, the repair attempt was unsuccessful (block 636), the second temporary copy subfile may be quarantined (block 640). In one embodiment, a determination may be made (block 448) as to whether to request a resending of the write update data from the second source or another source. If a resending of the write update data is requested and received, the resent write update data may be used to update (block 604) another (such as a third) temporary copy subfile and the operations of blocks 604-648 may be repeated.

If it is determined (block 648) that the resending of the write update data is not to be requested again, the second source of the infected write update data may be temporarily blocked (block 650) from further access to the subfile which was targeted by the write data update. In one embodiment, further operations may be performed for the quarantined second temporary copy subfile as explained in greater detail in connection with FIG. 13 above.

If the repair attempt (block 634) allows the updated second temporary copy subfile to pass (block 636) the scan, indicating that the repair was successful, the file 200 or its original subfile 205*b* may be updated (block 616) with the scanned, updated contents of the second temporary copy subfile. In addition, any blocks applied to prior sources of infected write data for the subfile of the file may be removed (block 620) to permit resumption of access to the subfile for the previously blocked sources.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for updating a file comprising operations by a processor, the operations comprising:
   receiving update data for updating a first subfile of a file;
   creating a first temporary copy subfile corresponding to the first subfile of the file;
   updating the first temporary copy subfile with the update data instead of updating the first subfile with the update data;
   scanning the updated first temporary copy subfile for malicious software so that the first temporary copy subfile is updated with the update data before the temporary copy subfile is scanned;
   in response to the updated first temporary copy subfile passing the scan, updating the first subfile with the scanned update of the first temporary copy subfile so that updating the first subfile with the update data is deferred until after the updated first temporary copy subfile passes the scan;
   in response to the updated first temporary copy subfile failing the scanning, repairing the updated first temporary copy subfile;
   rescanning the updated first temporary copy subfile; and
   in response to the updated first temporary copy subfile passing the rescan, updating the first subfile with the rescanned contents of the first temporary copy subfile.

2. The method of claim 1 wherein the first temporary copy subfile creating includes obtaining a temporary location for the first temporary copy subfile from a pool of available temporary locations, the operations further comprising releasing the temporary location for the first temporary copy subfile back to the pool of available temporary locations after updating the first subfile with the scanned contents of the first temporary copy subfile.

3. The method of claim 1 wherein the contents of the first subfile are at a first location and the contents of the first temporary copy subfile are at a first temporary location, and wherein the updating the first subfile with the rescanned contents of the first temporary copy subfile includes copying the rescanned contents of the first temporary location of the updated temporary copy subfile to the first location of the first subfile.

4. The method of claim 1 wherein the contents of the first subfile are at a first original location and the first subfile has a first location pointer identifying the first original location of the first subfile, wherein the contents of the first temporary copy subfile are at a first original temporary location and the first temporary copy subfile has a first temporary location pointer identifying the first original temporary location of the first temporary copy subfile and wherein the updating the first subfile with the scanned contents of the first temporary copy subfile includes updating the first location pointer for the first subfile to identify the first original temporary location of the first temporary copy subfile as the location of the first subfile instead of identifying the first original location as the location of the first subfile, and
  wherein the operations further comprise updating the first temporary location pointer for the first temporary copy subfile to identify the temporary location of the first temporary copy subfile as the first original location instead of identifying the first original temporary location of the first temporary copy subfile.

5. The method of claim 1 wherein a first host is the source of the update data for the first subfile, and the operations further comprise:
  in response to the updated first temporary copy subfile failing the rescanning, quarantining the updated first temporary copy subfile and blocking write data access by the first host to the first subfile.

6. The method of claim 5 wherein the operations further comprise:
  in response to the updated first temporary copy subfile being quarantined, requesting and receiving a resending of the update data for updating the first subfile of the file;
  creating a second temporary copy subfile corresponding to the first subfile of the file;
  updating the second temporary copy subfile with the resent update data instead of updating the first subfile with the resent update data;
  scanning the updated second temporary copy subfile; and
  in response to the updated second temporary copy subfile passing the scan, updating the first subfile with the scanned contents of the second temporary copy subfile and removing the blocking of write data access to the first subfile by the first host.

7. The method of claim 6, wherein the operations further comprise:
  in response to the updated second temporary copy subfile failing the scanning, repairing the updated second temporary copy subfile;
  rescanning the updated second temporary copy subfile; and
  in response to the updated second temporary copy subfile passing the rescan, updating the first subfile with the rescanned contents of the second temporary copy subfile.

8. The method of claim 7 wherein the operations further comprise:
  in response to the updated second temporary copy subfile failing the rescanning, quarantining the updated second temporary copy subfile.

9. The method of claim 5 wherein the operations further comprise:
  in response to the updated first temporary copy subfile being quarantined, requesting and receiving a resending of the update data from a second host for updating the first subfile of the file;
  creating a second temporary copy subfile corresponding to the first subfile of the file;
  updating the second temporary copy subfile with the resent update data instead of updating the first subfile with the resent update data;
  scanning the updated second temporary copy subfile; and
  in response to the updated second temporary copy subfile passing the scan, updating the first subfile with the scanned contents of the second temporary copy subfile and removing the blocking of write data access to the first subfile by the first host.

10. The method of claim 9, wherein the operations further comprise:
  in response to the updated second temporary copy subfile failing the scanning, repairing the updated second temporary copy subfile;
  rescanning the updated second temporary copy subfile; and
  in response to the updated second temporary copy subfile passing the rescan, updating the first subfile with the rescanned contents of the second temporary copy subfile.

11. The method of claim 10 wherein the operations further comprise:
  in response to the updated second temporary copy subfile failing the rescanning, quarantining the updated second temporary copy subfile.

12. A system, comprising:
  at least one storage system including at least one hardware storage unit adapted to store a file having a subfile of the file, and at least one storage controller adapted to access and control storage units of the at least one storage system; and
  at least one computer readable storage medium having computer readable program instructions embodied therewith, the program instructions executable by the storage system to cause the storage system to perform operations, the operations comprising:
  receiving update data for updating a first subfile of a file;
  creating a first temporary copy subfile corresponding to the first subfile of the file;
  updating the first temporary copy subfile with the update data instead of updating the first subfile with the update data;
  scanning the updated first temporary copy subfile for malicious software so that the first temporary copy subfile is updated with the update data before the temporary copy subfile is scanned;
  in response to the updated first temporary copy subfile passing the scan, updating the first subfile with the scanned update of the first temporary copy subfile so that updating the first subfile with the update data is deferred until after the updated first temporary copy subfile passes the scan;

in response to the updated first temporary copy subfile failing the scanning, repairing the updated first temporary copy subfile;

rescanning the updated first temporary copy subfile; and in response to the updated first temporary copy subfile passing the rescan, updating the first subfile with the rescanned contents of the first temporary copy subfile.

13. The system of claim 12 wherein at least one storage unit has a pool of available temporary locations, and wherein the first temporary copy subfile creating includes obtaining a temporary location for the first temporary copy subfile from the pool of available temporary locations, the operations further comprising releasing the temporary location for the first temporary copy subfile back to the pool of available temporary locations after updating the first subfile with the scanned contents of the first temporary copy subfile.

14. The system of claim 12 wherein the contents of the first subfile are at a first location and the contents of the first temporary copy subfile are at a first temporary location, and wherein the updating the first subfile with the rescanned contents of the first temporary copy subfile includes copying the rescanned contents of the first temporary location of the updated temporary copy subfile to the first location of the first subfile.

15. The system of claim 12 wherein the contents of the first subfile are at a first original location and the first subfile has a first location pointer identifying the first original location of the first subfile, wherein the contents of the first temporary copy subfile are at a first original temporary location and the first temporary copy subfile has a first temporary location pointer identifying the first original temporary location of the first temporary copy subfile and wherein the updating the first subfile with the scanned contents of the first temporary copy subfile includes updating the first location pointer for the first subfile to identify the first original temporary location of the first temporary copy subfile as the location of the first subfile instead of identifying the first original location as the location of the first subfile, and wherein the operations further comprise updating the first temporary location pointer for the first temporary copy subfile to identify the temporary location of the first temporary copy subfile as the first original location instead of identifying the first original temporary location of the first temporary copy subfile.

16. The system of claim 12 further comprising at least one of a first host and a second host in which the first host is the source of the update data for the first subfile, and wherein the operations further comprise:

in response to the updated first temporary copy subfile failing the rescanning, quarantining the updated first temporary copy subfile and blocking write data access by the first host to the first subfile;

in response to the updated first temporary copy subfile being quarantined, requesting and receiving a resending of the update data from at least one of the first host and second host for updating the first subfile of the file;

creating a second temporary copy subfile corresponding to the first subfile of the file;

updating the second temporary copy subfile with the resent update data instead of updating the first subfile with the resent update data;

scanning the updated second temporary copy subfile;

in response to the updated second temporary copy subfile passing the scan, updating the first subfile with the scanned contents of the second temporary copy subfile and removing the blocking of write data access to the first subfile by the first host;

in response to the updated second temporary copy subfile failing the scanning, repairing the updated second temporary copy subfile;

rescanning the updated second temporary copy subfile;

in response to the updated second temporary copy subfile passing the rescan, updating the first subfile with the rescanned contents of the second temporary copy subfile; and in response to the updated second temporary copy subfile failing the rescanning, quarantining the updated second temporary copy subfile.

17. A computer program product for use with at least one storage system including at least one storage unit adapted to store a file having a subfile of the file, and at least one storage controller adapted to access and control storage units of the at least one storage system, the computer program product comprising at least one computer readable storage medium having computer readable program instructions embodied therewith, the program instructions executable by the storage system to cause the storage system to perform operations, the operations comprising:

receiving update data for updating a first subfile of a file;

creating a first temporary copy subfile corresponding to the first subfile of the file;

updating the first temporary copy subfile with the update data instead of updating the first subfile with the update data;

scanning the updated first temporary copy subfile for malicious software so that the first temporary copy subfile is updated with the update data before the temporary copy subfile is scanned;

in response to the updated first temporary copy subfile passing the scan, updating the first subfile with the scanned update of the first temporary copy subfile so that updating the first subfile with the update data is deferred until after the updated first temporary copy subfile passes the scan;

in response to the updated first temporary copy subfile failing the scanning, repairing the updated first temporary copy subfile;

rescanning the updated first temporary copy subfile; and in response to the updated first temporary copy subfile passing the rescan, updating the first subfile with the rescanned contents of the first temporary copy subfile.

18. The computer program product of claim 17 wherein the at least one storage unit has a pool of available temporary locations, and wherein the first temporary copy subfile creating includes obtaining a temporary location for the first temporary copy subfile from the pool of available temporary locations, the operations further comprising releasing the temporary location for the first temporary copy subfile back to the pool of available temporary locations after updating the first subfile with the scanned contents of the first temporary copy subfile.

19. The computer program product of claim 17 herein the contents of the first subfile are at a first location and the contents of the first temporary copy subfile are at a first temporary location, and wherein the updating the first subfile with the rescanned contents of the first temporary copy subfile includes copying the rescanned contents of the first temporary location of the updated temporary copy subfile to the first location of the first subfile.

20. The computer program product of claim 17 wherein the contents of the first subfile are at a first original location and the first subfile has a first location pointer identifying the first original location of the first subfile, wherein the contents of the first temporary copy subfile are at a first original temporary location and the first temporary copy subfile has a first temporary location pointer identifying the first original temporary location of the first temporary copy subfile and wherein the updating the first subfile with the scanned contents of the first temporary copy subfile includes updating the first location pointer for the first subfile to identify the first original temporary location of the first temporary copy subfile as the location of the first subfile instead of identifying the first original location as the location of the first subfile, and wherein the operations further comprise updating the first temporary location pointer for the first temporary copy subfile to identify the temporary location of the first temporary copy subfile as the first original location instead of identifying the first original temporary location of the first temporary copy subfile.

21. The computer program product of claim 17 further comprising at least one of a first host and a second host in which the first host is the source of the update data for the first subfile, and wherein the operations further comprise:

in response to the updated first temporary copy subfile failing the rescanning, quarantining the updated first temporary copy subfile and blocking write data access by the first host to the first subfile;

in response to the updated first temporary copy subfile being quarantined, requesting and receiving a resending of the update data from at least one of the first host and second host for updating the first subfile of the file;

creating a second temporary copy subfile corresponding to the first subfile of the file;

updating the second temporary copy subfile with the resent update data instead of updating the first subfile with the resent update data;

scanning the updated second temporary copy subfile;

in response to the updated second temporary copy subfile passing the scan, updating the first subfile with the scanned contents of the second temporary copy subfile and removing the blocking of write data access to the first subfile by the first host;

in response to the updated second temporary copy subfile failing the scanning, repairing the updated second temporary copy subfile;

rescanning the updated second temporary copy subfile;

in response to the updated second temporary copy subfile passing the rescan, updating the first subfile with the rescanned contents of the second temporary copy subfile; and in response to the updated second temporary copy subfile failing the rescanning, quarantining the updated second temporary copy subfile.

* * * * *